(12) United States Patent
Fujii et al.

(10) Patent No.: US 6,371,651 B1
(45) Date of Patent: Apr. 16, 2002

(54) THRUST DYNAMIC PRESSURE BEARING

(75) Inventors: Yoshiki Fujii; Takeshi Takahashi, both of Kashiba (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/455,915

(22) Filed: Dec. 7, 1999

(30) Foreign Application Priority Data

Dec. 9, 1998 (JP) .......................................... 10-349884

(51) Int. Cl.⁷ ................................................ F16C 32/06
(52) U.S. Cl. ...................................... 384/121; 384/110
(58) Field of Search ................................ 384/107, 108, 384/109, 110, 112, 121, 123

(56) References Cited

U.S. PATENT DOCUMENTS

| | | | | |
|---|---|---|---|---|
| 2,966,381 A | * | 12/1960 | Menzel | 384/110 |
| 3,174,809 A | * | 3/1965 | Mackie | 384/110 X |
| 3,749,456 A | * | 7/1973 | Whitaker | 384/110 X |
| 4,575,264 A | * | 3/1986 | Mizobunchi et al. | 384/123 X |
| 5,518,319 A | * | 5/1996 | Selby | 384/110 X |
| 5,789,839 A | * | 8/1998 | Langenbeck | 384/109 X |
| 5,795,073 A | * | 8/1998 | Arvidsson et al. | 384/110 |
| 5,855,436 A | * | 1/1999 | Eum et al. | 384/110 |
| 5,952,752 A | * | 9/1999 | Kim | 384/108 X |
| 6,020,664 A | * | 2/2000 | Liu et al. | 384/112 X |
| 6,127,756 A | * | 10/2000 | Iwaki et al. | 384/110 X |

FOREIGN PATENT DOCUMENTS

| | | | | |
|---|---|---|---|---|
| GB | 0411696 A2 | * | 2/1991 | 384/110 |
| JP | 55-109822 | * | 8/1980 | 384/110 |
| JP | 7-52419 | | 10/1991 | |

* cited by examiner

Primary Examiner—David Fenstermacher
Assistant Examiner—Colby Hansen
(74) Attorney, Agent, or Firm—Jacobson Holman PLLC

(57) ABSTRACT

It is an object of the invention to provide a thrust dynamic pressure bearing in which an unsymmetrical contact during rotation is prevented from occurring, and a dynamic pressure space is prevented from being clogged with abrasion powder generated by a contact at starting and stopping. In the thrust dynamic pressure bearing of the invention, a flange disposed on a shaft is tapered as moving form toward the outer circumference thereof, so that a dynamic pressure space between a thrust bearing face of a housing and a thrust receiving face of the shaft during rotation becomes wider toward the outer circumference thereof. Even if the shaft is tilted with respect the housing during rotation, therefore, it is possible to prevent an unsymmetrical contact of the thrust receiving face of the shaft in the vicinity of the circumference against the thrust bearing face of the housing, from occurring. In addition, the dynamic pressure space becomes wider as moving toward the outer circumference, so that the abrasion powder generated by the contact at starting and stopping can be easily discharged from a radially inward portion toward a radially outward portion of the dynamic pressure space.

2 Claims, 1 Drawing Sheet

THRUST DYNAMIC PRESSURE BEARING

BACKGROUND OF THE INVENTION

The invention relates to a thrust dynamic pressure bearing.

Conventionally, as shown in FIG. 2, a thrust dynamic pressure bearing is configured so that a flanged shaft 102 is inserted into a sleeve 101, and a flange-like plate 105 fixed to an end of the sleeve 101 and a step portion 101A of the sleeve 101 are opposed to a flange 103 of the shaft 102 with forming a predetermined dynamic pressure space S therebetween. The sleeve 101 and the plate 105 constitute a housing 100.

Dynamic pressure generating grooves 106 and 107 are formed in end faces of the flange 103, respectively. The space between the housing 101 and the flanged shaft 102 is filled with a dynamic pressure generating lubricant (not shown).

In the thrust dynamic pressure bearing, when the flanged shaft 102 relatively rotates with respect to the sleeve 101, the dynamic pressure generating grooves 106 and 107 formed in the flange 103 cause the dynamic pressure generating lubricant to generate a dynamic pressure, so as to support the shaft 102 with respect to the sleeve 101 in the thrust direction.

The prior art thrust dynamic pressure bearing involves the following problem. When the flange 103 is tilted with respect to the direction perpendicular to the axial center of the shaft 102, or when a force of tilting the shaft 102 with respect to the sleeve 101 is produced, an outer circumference portion 103A of the flange 103 comes into contact with the sleeve 101 and the plate 105, so as to cause some deficiency such as abrasion.

The thrust dynamic pressure bearing has another problem as follows. Even if the flange 103 is precisely perpendicular to the axial center of the shaft, the flange 103 unavoidably comes into contact with the sleeve 101 at starting and stopping. The dynamic pressure space S is easily clogged with abrasion powder generated by the contact.

SUMMARY OF THE INVENTION

Consequently, it is an object of the invention to provide a thrust dynamic pressure bearing in which an unsymmetrical contact during rotation is prevented from occurring, and a dynamic pressure space is prevented from being clogged with abrasion powder generated by a contact at starting and stopping.

In order to attain the object, the thrust dynamic pressure bearing of the invention of claim 1 is a thrust dynamic pressure bearing in which a thrust bearing face disposed on a housing is opposed to a thrust receiving face of a flange-like thrust receiving portion disposed on a shaft, at least one of the thrust bearing face and the thrust receiving face has dynamic pressure generating grooves for generating a dynamic pressure, and a space between the thrust bearing face and the thrust receiving face is filled with a lubricant, and is characterized in that the thrust receiving portion has a substantially tapered shape in section, a thickness of the thrust receiving portion becoming smaller as moving toward an outer circumference.

In the invention of claim 1, since the flange-like thrust receiving portion disposed on the shaft is tapered as moving toward the outer circumference thereof, the dynamic pressure space between the thrust bearing face of the housing and the thrust receiving face of the shaft during rotation becomes wider as moving toward the outer circumference thereof. According to the invention, even if the shaft is tilted with respect to the housing during rotation, therefore, it is possible to prevent an unsymmetrical contact of the thrust receiving face of the shaft in the vicinity of the outer circumference against the thrust bearing face of the housing, from occurring. In addition, since the dynamic pressure space becomes wider as moving toward the outer circumference, the abrasion powder generated by the contact at starting and stopping can be easily discharged from a radially inward portion toward a radially outward portion of the dynamic pressure space.

According to the invention, therefore, an unsymmetrical contact during rotation can be prevented from occurring, and the dynamic pressure space can be prevented from being clogged with the abrasion powder generated by the contact at starting and stopping. Consequently, a stable operation can be realized.

The thrust dynamic pressure bearing of the present invention is characterized in that a level difference between an innermost circumference end and an outermost circumference end of the thrust receiving portion is set in the range of 1 to 5 $\mu$m.

In the present invention, since the level difference between the innermost circumference end and the outermost circumference end of the thrust receiving portion of the shaft is set in the range from 1 to 5 $\mu$m, it is possible to prevent an unsymmetrical contact and the clog with the abrasion powder from occurring, while the dynamic pressure generating performance is sufficiently maintained.

If the level difference between the innermost circumference end and the outermost circumference end is set to be smaller than 1 $\mu$m, it is difficult to prevent an unsymmetrical contact and the clog with the abrasion powder from occurring. If the level difference exceeds 5 $\mu$m, the dynamic pressure generating performance is insufficient.

DETAILED DESCRIPTION OF THE PREFERRED EMBODIMENTS

Hereinafter, embodiments of the invention will be described in detail with reference to the accompanying drawings.

Figure 1:
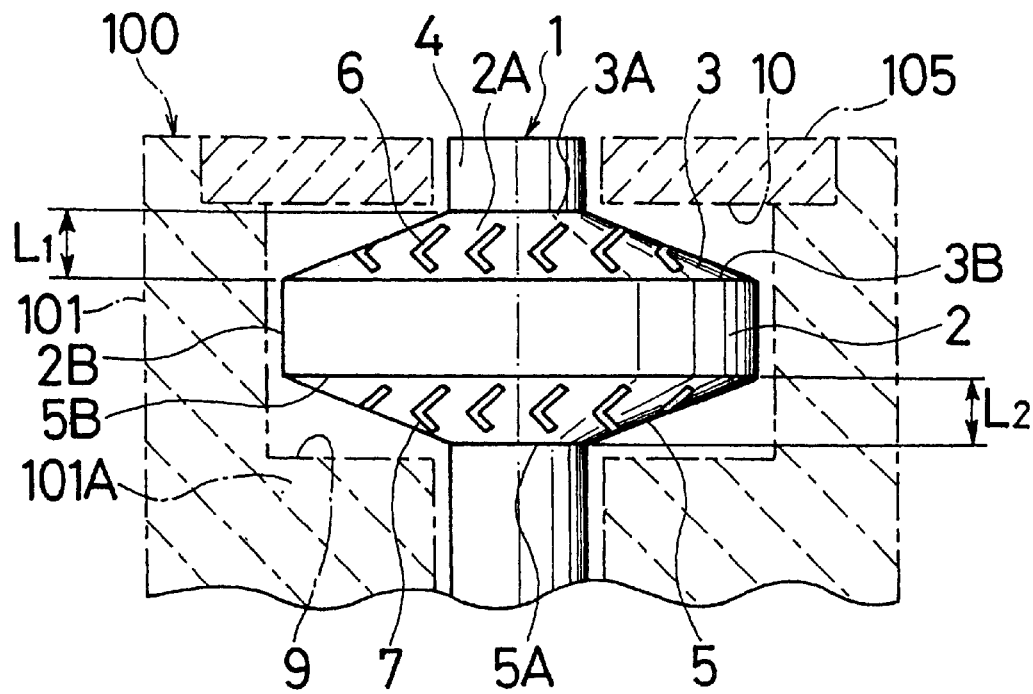
FIG. 1 is a diagram showing main portions of an embodiment of the thrust dynamic pressure bearing of the invention.
Figure 2:
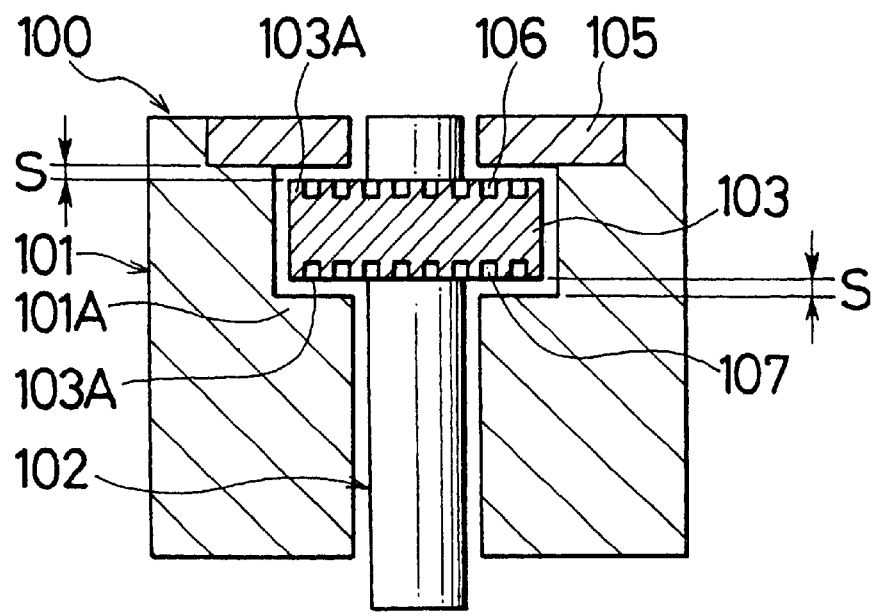
FIG. 2 is a section view showing a thrust dynamic pressure bearing of the prior art.

FIG. 1 shows main portions of an embodiment of the thrust dynamic pressure bearing of the invention. The embodiment includes a housing 100 constituted by a sleeve 101 and a plate 105 of the prior art shown in FIG. 2, and a flanged shaft 1.

The flanged shaft 1 has a shaft 4 and a flange 2 serving as a thrust receiving portion. The flange 2 includes an upward thrust receiving face 3 and a downward thrust receiving face 5. The flange 2 is tapered as moving from an inner circumference end 2A to an outer circumference end 2B. The shape of a truncated conical face of each of the upward thrust receiving face 3 and the downward thrust receiving face 5 is formed by a coining process using dies having a truncated conical face. The level difference L1 between an inner circumference end 3A and an outer circumference end 3B of the upward thrust receiving face 3 is set to be 3 µm, and the level difference L2 between an inner circumference end 5A and an outer circumference end 5B of the downward thrust receiving face 5 is set to be 3 µm. In FIG. 1, the level differences L1 and L2 are shown in an exaggerated manner by 1,000 times or more. Herringbone-type dynamic pressure generating grooves 6 and 7 are formed in the upward thrust receiving face 3 and the downward thrust receiving face 5, respectively.

The flange 2 is accommodated in the housing 100, so that the upward thrust receiving face 3 has a predetermined dynamic pressure space with respect to a thrust bearing face 10 of the plate 105, and the downward thrust receiving face 5 has a predetermined dynamic pressure space with respect to a thrust bearing face 9 of a step portion 101A of the sleeve 101. The space between the flange 2 and the housing 100 is filled with a predetermined lubricant fluid for generating a dynamic pressure.

In the thus configured thrust dynamic pressure bearing, when the shaft 1 rotates with respect to the housing 100, the dynamic pressure generating grooves 6 formed in the upward thrust receiving face 3 of the flange 2 generate a dynamic pressure in the dynamic pressure generating fluid between the flange and the plate 105. The dynamic pressure generating grooves 7 formed in the downward thrust receiving face 5 generate a dynamic pressure in the dynamic pressure generating fluid between the flange and the thrust bearing face 9 of the step portion 101A. The shaft 1 is supported in the axial direction with respect to the housing 100 by the dynamic pressure.

In the embodiment, the flange 2 disposed on the shaft 1 is tapered as moving toward the outer circumference thereof, so that the respective dynamic pressure spaces between the thrust bearing faces 10 and 9 of the housing 100 and the upward and downward thrust receiving faces 3 and 5 of the shaft 1 during rotation become wider as moving toward the outer circumference. Accordingly, even if the shaft 1 is tilted with respect to the housing 100 during rotation, it is possible to prevent an unsymmetrical contact of the upward and downward thrust receiving faces 3 and 5 of the shaft 1 in the vicinity of the outer circumference against the thrust bearing faces 10 and 9 of the housing 100, from occurring. In addition, since the dynamic pressure space becomes wider as moving toward the outer circumference, the abrasion powder generated by the contact of the flange 2 with the housing 100 at starting and stopping can be easily discharged from a radially inward portion to the radially outward portion of the dynamic pressure space.

According to the embodiment, therefore, an unsymmetrical contact during rotation can be prevented from occurring. In addition, the dynamic pressure space can be prevented from being clogged with the abrasion powder generated by the contact at starting and stopping. Thus, the stable operation can be realized.

In the embodiment, the dynamic pressure generating grooves 6 and 7 are formed in the upward thrust receiving face 3 and the downward thrust receiving face 5 of the flange 2. Alternatively, dynamic pressure generating grooves may be formed in the thrust bearing faces 9 and 10 of the housing 100. In the embodiment, the level differences L1 and L2 between the inner circumference ends 3A and 5A and the outer circumference ends 3B and 5B of the upward and downward thrust receiving faces 3 and 5 are set to be 3 µm. Each of the level differences L1 and L2 may be set in the range of 1 to 5 µm. If each of the level differences L1 and L2 is smaller than 1 µm, the effect of preventing an unsymmetrical contact cannot be attained. If each of the level differences L1 and L2 exceeds 5 µm, the dynamic pressure generating performance becomes insufficient.

As apparent from the above description, in the thrust dynamic pressure bearing of the invention of claim 1, since the flange-like thrust receiving portion disposed on the shaft is tapered as moving toward the outer circumference thereof, the dynamic pressure space between the thrust bearing face of the housing and the thrust receiving face of the shaft during rotation becomes wider as moving toward the outer circumference thereof. According to the invention, even if the shaft is tilted with respect to the housing during rotation, therefore, it is possible to prevent an unsymmetrical contact of the thrust receiving face of the shaft in the vicinity of the outer circumference against the thrust bearing face of the housing, from occurring. In addition, since the dynamic pressure space becomes wider as moving toward the outer circumference, the abrasion powder generated by the contact at starting and stopping can be easily discharged from a radially inward portion toward a radially outward portion of the dynamic pressure space. According to the invention, therefore, an unsymmetrical contact during rotation can be prevented from occurring, and the dynamic pressure space can be prevented from being clogged with the abrasion powder generated by the contact at starting and stopping. Consequently, a stable operation can be realized.

According to the thrust dynamic pressure bearing of the present invention, the level difference between the innermost circumference end and the outermost circumference end of the thrust receiving portion of the shaft is set in the range from 1 to 5 µm. Thus, it is possible to prevent an unsymmetrical contact and the clog with the abrasion powder from occurring, while the dynamic pressure generating performance is sufficiently maintained.

What is claimed is:

1. A thrust dynamic pressure bearing in which first and second thrust bearing faces disposed on a housing are respectively opposed to one thrust receiving face and another thrust receiving face of a flange-like thrust receiving portion disposed on a shaft, and have a communication portion through which outer circumference end portions of said first and second thrust bearing faces communicate with each other by means of a minute gap with respect to an outer circumference face of said flange-like thrust receiving portion, at least one of said opposing thrust bearing and thrust receiving faces has dynamic pressure generating grooves for generating a dynamic pressure, and a sealed space defined by said opposing thrust bearing and thrust receiving faces, said communication portions of said thrust bearing faces, and said outer circumference face of said flange-like thrust receiving portion is filled with a lubricant, wherein said thrust receiving portion has a substantially tapered shape in section, a thickness of said thrust receiving portion becoming smaller as moving toward an outer circumference of said thrust receiving portion, and axial spaces between said thrust receiving portion and said thrust bearing faces become wider as moving toward the outer circumference of said thrust receiving portion.

2. The thrust dynamic pressure bearing according to claim 1, wherein a level difference between an innermost circumference end and an outermost circumference end of said thrust receiving portion is set in the range of 1 to 5 µm.

* * * * *